United States Patent [19]
Yang et al.

[11] Patent Number: 6,031,570
[45] Date of Patent: Feb. 29, 2000

[54] IMAGE ACQUISITION AND PROCESSING SYSTEM

[75] Inventors: Hongli Yang, Santa Clara; Datong Chen, Fremont; Tai Ching Shyu, Cupertino, all of Calif.

[73] Assignee: OmniVision Technologies, Inc., Sunnyvale, Calif.

[21] Appl. No.: 08/821,120

[22] Filed: Mar. 19, 1997

[51] Int. Cl.[7] .................................................. H04N 3/14
[52] U.S. Cl. .......................................... 348/300; 348/294
[58] Field of Search .................................. 348/241, 243, 348/294, 300

[56] References Cited

U.S. PATENT DOCUMENTS

| | | | |
|---|---|---|---|
| 4,575,638 | 3/1986 | Okumura | 358/448 |
| 5,060,071 | 10/1991 | Ino | 358/482 |
| 5,146,339 | 9/1992 | Shinohara et al. | 358/212 |
| 5,231,503 | 7/1993 | Nagatake et al. | 348/245 |
| 5,736,886 | 4/1998 | Mangelsdorf et al. | 327/310 |

FOREIGN PATENT DOCUMENTS

| | | | |
|---|---|---|---|
| 0 488 674 A2 | 6/1992 | European Pat. Off. | H04N 5/217 |
| WO 82/01275 | 4/1982 | WIPO | H01J 40/14 |
| WO 96/17471 | 6/1996 | WIPO | H04N 5/217 |

*Primary Examiner*—Tuan Ho
*Assistant Examiner*—Luong Nguyen
*Attorney, Agent, or Firm*—Wilson, Sonsini Goodrich & Rosati

[57] ABSTRACT

An image acquisition and processing system that can eliminate or reduce the effects of offset voltage and threshold voltage is disclosed. The system contains a plurality of operational amplifiers each is used in an integrator. Each of the operational amplifiers has an offset voltage. The output of the integrator is sampled twice by a dual sampling circuit, one when connected to a photo-sensor and the other when not connected to the photo-sensor. The difference between the two samplings cancels out the effect of the offset voltage. The system also contains a plurality of transistors used as source follower. Each of the transistors is connected to an output terminal of the dual sampling circuit. These transistors have different threshold voltages. The output of a transistor is sampled. A predetermined voltage is then applied to the transistor and the output is again sampled. The difference between these two samples cancels out the effect of the threshold voltage. The effect of the predetermined voltage can be canceled out by taking a second difference between the twice sampled output originated from two transistors.

3 Claims, 7 Drawing Sheets

FIGURE 7

IMAGE ACQUISITION AND PROCESSING SYSTEM

FIELD OF THE INVENTION

The present invention relates to image-sensors, and more particularly to circuits for accurately processing signals generated by an array of photo-sensors.

BACKGROUND OF THE INVENTION

Semiconductor fabrication technology has advanced greatly over the last ten years. It is now possible to place a large number of solid state elements on a single semiconductor chip. One of the applications of this advanced fabrication technology is to build single chip image acquisition and processing units. This chip contains an array of image sensors and associated signal processing circuitry. The output of this chip is image signal that can be used for various applications. This arrangement allows low cost and light weight image capturing devices to be built. Examples of such devices are hand-held video camera, portable multimedia computer, surveillance devices, etc.

Typically, image acquisition is performed using an array of photo-sensors, one for each picture element (pixel). The resolution of the array is related to the number of photo-sensors in the array. In order to increase resolution, the number of photo-sensors need to be large. As a result, the size of each photo-sensor is small. Because the signal generated by a photo-sensor is typically related to the size of the sensor, the signal in a high resolution array is weak. Thus, there is a need to develop circuits that can accurately process weak signals.

One of the problems in designing a single chip image processing system is that the characteristics of the components therein (e.g., op-amps and transistors) could have wide variations. As a result, it is difficult to ensure that the signals of all the photo-sensors are processed in a uniform manner. As an example, consider two identical photo-sensors each receiving identical amount of radiation (e.g., light). Ideally, the final processed signal related to these two photo-sensors are the same. However, if the signal processing circuit connected to these two photo-sensors have different characteristics, the output signal would not be the same. Consequently, the processed image would be distorted. This is certainly undesirable.

SUMMARY OF THE INVENTION

The present invention provides a circuitry that can eliminate or reduce the effects of the variation in the characteristics of some of the components in an image acquisition and processing system that is fabricated on a semiconductor chip.

In one embodiment of the present invention, an integrator containing an operational amplifier (op-amp) is used to integrate charges in a photo-sensor. The magnitude of the charges is related to the intensity of radiation received by the photo-sensor. The integrator is connected to a photo-sensor at predetermined time intervals. The op-amp has an offset voltage. The output voltage of the integrator is affected by this offset voltage. One aspect of the present invention is means for eliminating or reducing the effect of this offset voltage on the final output. One way to accomplish this objective is to have a dual sampling circuit attached to the output of the integrator. One half of the dual sampling circuit is used to storage the voltage resulted from applying a photo-sensor to the integrator. The second half of the dual sampling circuit is used to storage the voltage when the integrator is not connected to the photo-sensor. The voltages at both halves of the sampling circuit are equally affected by the offset voltage. The effect of the offset voltage can be canceled by taking the differences of these two voltages.

The output of each half of the dual sampling circuit is preferably connected to a source follower. A transistor is preferably used as the source follower because of its small size. It is known that transistors have a threshold voltage that can affect the output voltage. Because the threshold voltage of transistors could be different, the output voltages of the two transistors (each connected to one of the two outputs of the dual sampling circuit) could be affected differently by the different threshold voltages. This is undesirable because the same voltages generated by the two outputs of the dual sampling circuit (and connected to the inputs of the two transistors) would give rise to two different output voltages at the outputs of the transistor. One aspect of the present invention is means to eliminate or reduce the effect of the threshold voltage difference.

In one embodiment, the output of each transistor is sampled twice. In the first sampling, the inputs of the two transistors are connected to the individual outputs of the dual sampling circuit. The output of each transistor in response to the voltage at the dual sampling circuit is affected by its threshold voltage. The inputs of the two transistors are then brought to a common potential. The outputs of the two transistors are then sampled again. This output of each transistor is affected by its threshold voltage in the same way as the first sampling. By taking the difference between the first and the second samples, the effect of the threshold voltage is eliminated or reduced. The effect of the common potential can be eliminated by taking a second difference between the twice-sampled output originated by the two transistors.

These and other features of the present invention will become apparent from the following description when read in conjunction with the drawings and the appended claims.

DETAILED DESCRIPTION OF THE INVENTION

The present invention comprises a novel image capturing and processing system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
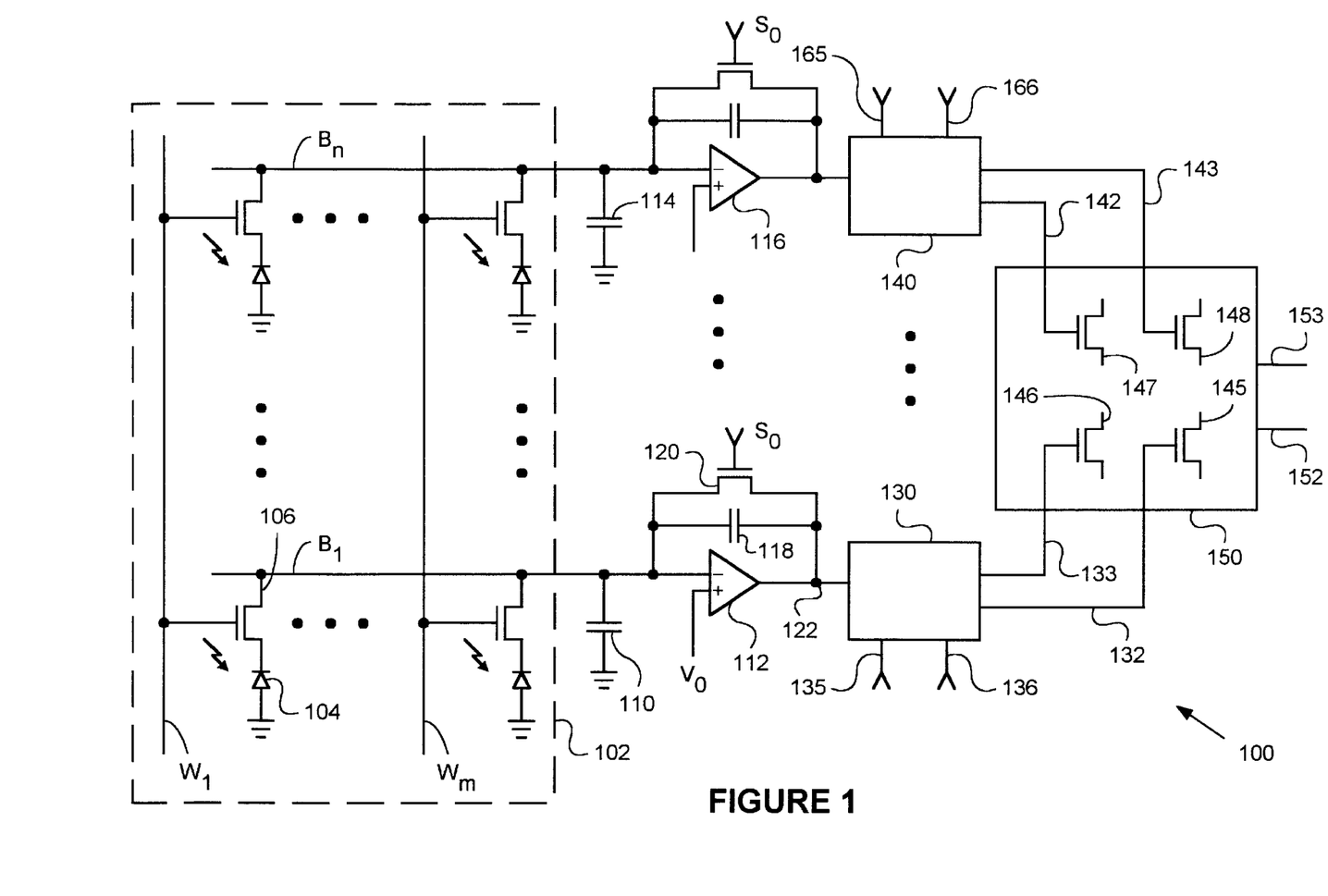
FIG. 1 is a schematic diagram of an image acquisition and processing system of the present invention.

FIG. 1 is a schematic diagram of an image acquisition and processing system 100 of the present invention. System 100 contains an acquisition portion 102 comprising a plurality of photo-diodes arranged in the form of rows and columns. Each photo-diode is controlled by a pass transistor. For example, photo-diode 104 is connected to a first conduction terminal of a pass transistor 106. The gate of pass transistor 106 is connected to a word line $W_1$ while the second conduction terminal of pass transistor is connected to a bit line $B_1$. By periodically activating word line $W_1$, photo-diode 104 is periodically connected to a bit line $B_1$, which is in turn connected to a processing stage. As a result, the charge on photo-diode 104 can be periodically sampled and processed.

It should be noted that the image acquisition circuit shown in FIG. 1 is only one example of circuits that can perform image acquisition functions. For example, photo-transistors could be used in place of photo-diodes.

System 100 has n different bit lines (shown as $B_1$ to $B_n$) and m different word lines (shown as $W_1$ to $W_m$). The numbers n and m could be the same. Each bit line is connected to a separate processing stage. All the processing stages have substantially the same circuit configuration. For example, bit line $B_1$ is connected to a negative terminal of an operational amplifier (op-amp) 112. Capacitor 110 is connected to ground. Similarly, bit line $B_n$ is connected to a negative terminal of an op-amp 116. FIG. 1 also shows two stray capacitors 110 and 114 connected to bit lines $B_1$ and $B_n$, respectively.

The circuit components attached to bit lines $B_1$ to $B_n$ are substantially the same. Consequently, only components attached to bit line $B_1$ is described in detail here. In this embodiment, op-amp 112 is configured as an integrator: its positive input terminal is connected to a voltage reference having a value of $V_o$, and its output terminal 122 and negative terminal are connected to separate ends of a capacitor 118. A transistor 120 is connected in parallel with capacitor 118. The gate terminal of this transistor is coupled to a timing signal $S_o$. When the polarity of signal $S_o$ is positive, capacitor 118 is shorted (thereby removing any charge stored therein). Further, negative input terminal and output terminal of op-amp have the same potential as $V_o$ at this time. Thus, the effect of this polarity is that the integrator and capacitor 110 are reset. When the polarity of signal $S_o$ is negative, capacitor 118 and op-amp 112 integrate the charge present at the negative input terminal of op-amp 112. To a first order of approximation, the change in voltage ($\delta V_{int}$) of this integrator can be calculated from:

$$\delta V_{int} = \delta Q/C_{118};$$

where $\delta Q$ is the changes in charge and $C_{118}$ is the capacitance of capacitor 118. This voltage is present at the output terminal 122 of op-amp 112. The charge originates from the charge generated by a photo-diode in response to intensity of radiation (including light) imparted thereon. As a result, it is possible to electrically capture an image by using an array of photo-diodes and processing circuitry.

A similar circuit consisting of a capacitor, a transistor and op-amp 116 is coupled to bit line $B_n$. This circuit serves to integrate charges of photo-diodes associated with bit line $B_n$. As pointed out above, each bit line has a similar integrator coupled thereto. Thus, there are n different op-amps.

Figure 2:
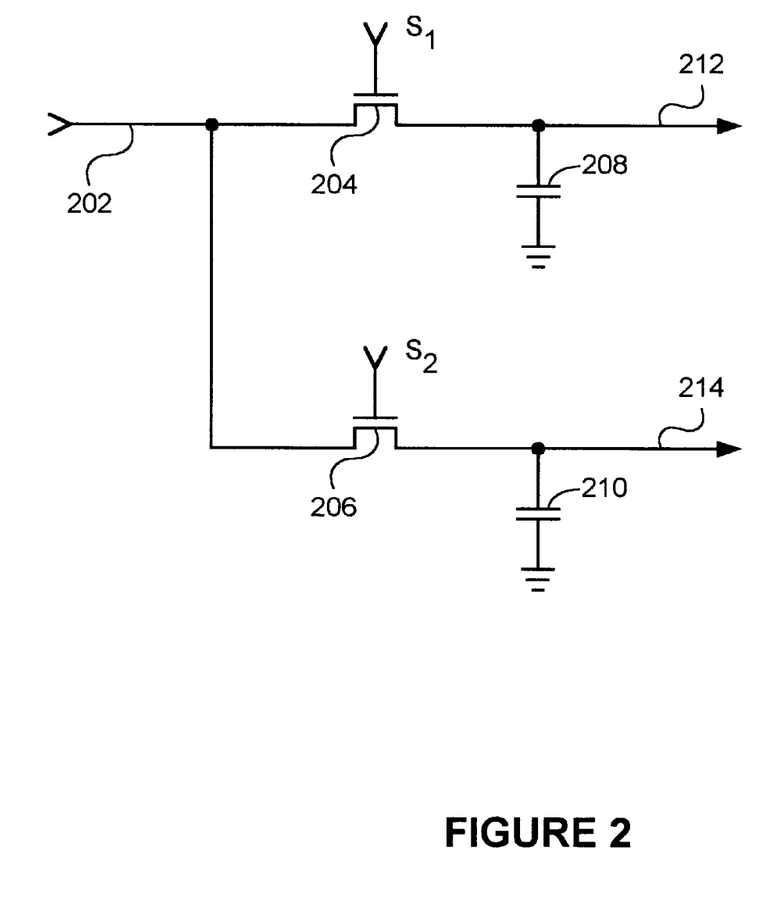
FIG. 2 is a schematic diagram of a circuit arrangement of the present invention that can eliminate the effect of offset voltage of an operational amplifier.

It is known that the output voltage of a physical op-amp is affected by the offset voltage of the op-amp ($V_{off}$). This offset voltage is typically different for different op-amps, even when the op-amps are fabricated in the same integrated circuit. As a result, the integrators connected to the bit lines would give rise to different output voltages even when the same charge is applied thereto. This is certainly undesirable. One aspect of the present invention is a circuit for eliminating the effect of this offset voltage on the output signal. The circuit coupled to op-amp 112 is shown as block 130. A schematic diagram showing one embodiment of block 130 is shown in FIG. 2. The input terminal of block 130 is coupled to output terminal 122 of op-amp 112. Block 130 generates two output signals on lines 132 and 133 in response to two timing signals 135–136. As explained below, each of these output signals on lines 132–133 is designed to have a component equal to the offset voltage of op-amp 112. As a result, the effect of the offset voltage can be canceled by taking the difference between these two output signals.

FIG. 2 is a schematic diagram of an embodiment of block 130. It contains two transistors 204 and 206. One of the conduction terminals of transistors 204 and 206 is connected to output terminal 122 of op amp 112 through a line 202. The other conduction terminal of transistor 204 is connected to a line 212 and one end of a capacitor 208. The other end of capacitor 208 is connected to ground. The signal at line 212 corresponds to signal 133 of FIG. 1. Similarly, the other conduction terminal of transistor 206 is connected to a line 214 and one end of a capacitor 210. The other end of capacitor 210 is connected to ground. The signal at line 214 corresponds to signal 132 of FIG. 1.

The operation of block 130 is controlled by two timing signals $S_1$ and $S_2$ connected to the gate terminals of transistors 204 and 206, respectively. These two signals correspond to signals 135 and 136 of FIG. 1.

The operation of block 130 is explained with reference to the timing diagrams in FIG. 3. It shows the timing of control signals $S_0$, $S_1$, $S_2$, word line $W_1$, and the voltages at lines 202, 212 and 214 (i.e., $V_{202}$, $V_{212}$ and $V_{214}$). Time is divided, for convenience, into five intervals, $T_1$–$T_5$. At time interval $T_1$, $S_0$ turns positive. Thus, the voltage at the two input terminals and the output terminal of op-amp 112 are the same, i.e., $V_o$ because of the well-known property of an op-amp. Consequently, the voltage at line 202 (which is connected to the output terminal of op-amp 112) is also equal to $V_o$. This is shown in region 242 of $V_{202}$ in FIG. 3.

$S_0$ is set such that it turns negative after $T_1$. Op-amp 112 begins to integrate charges flowing to its negative input terminal. The voltage at its output terminal (and thus at line 202) starts to change. It reaches a steady level (depending on the charge on an associated photo-diode) shortly after $T_1$. This is shown in region 244 of $V_{202}$ in FIG. 3.

At time interval $T_2$, the signal $S_1$ becomes positive. As a result, transistor 204 is conducting. Capacitor 208 (and thus $V_{212}$) is now charged to substantially the same voltage level as line 202. At time interval $T_3$, the signal $S_1$ returns to ground. As a result, transistor 204 is closed. Thus, the charge stored in capacitor 208 is held therein (subject to leakage effect). The voltage $V_{212}$ remains at substantially the same voltage level. This is shown in region 248 of $V_{212}$ of FIG. 3.

At interval $T_3$, both signal $S_2$ and the voltage at word line $W_1$ turn positive. When word line $W_1$ turns positive, pass transistor 106 is turned on, thereby connecting photo-diode 104 to op-amp 112. As a result, $V_{202}$ increases again. This is shown in region 250 of $V_{202}$ in FIG. 3. Because signal $S_2$ is positive, transistor 206 is turned on. Thus, voltage $V_{214}$ and the voltage of capacitor 210 is substantially the same as voltage $V_{202}$. This is shown in a region 252 of $V_{214}$ in FIG. 3.

After time interval $T_4$, signal $S_2$ returns to ground level. As a result, transistor 206 is closed. Thus, the charge stored in capacitor 210 is held therein (subject to leakage effect). The voltage $V_{214}$ remains at substantially the same level as the result of the holding action of capacitor 210.

Voltage $V_{212}$ can be considered a default voltage ($V_{def}$), i.e., the voltage when there is no signal on the photo-diode. As explained above, an offset voltage ($V_{off}$) is introduced by op-amp 112. As a result, $V_{212}=V_{off}+V_{def}$.

Figure 3:
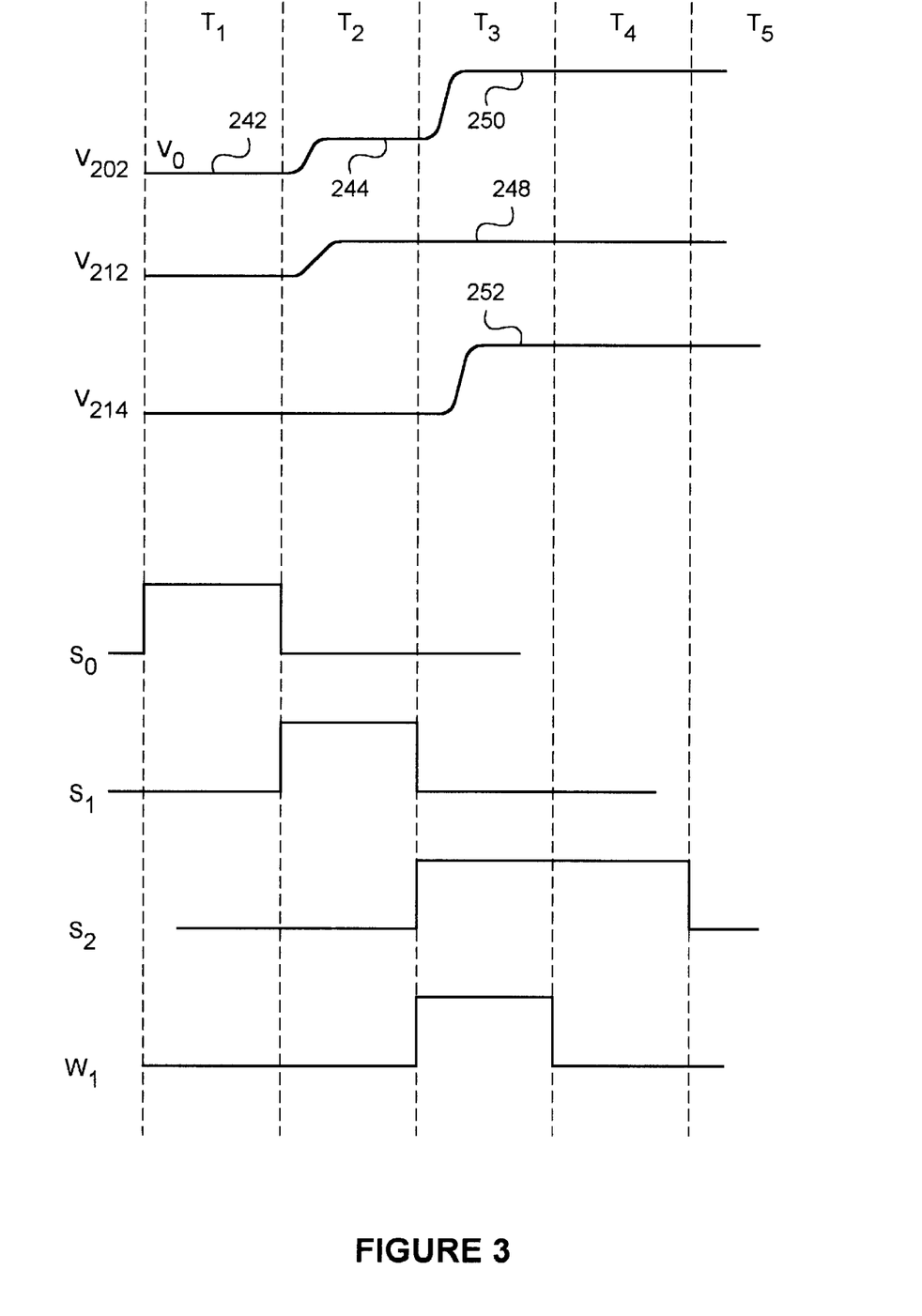
FIG. 3 shows timing diagrams related to the operation of the circuit arrangement of FIG. 2.

It can be seen from FIG. 3 that voltage $V_{214}$ is equal to the sum of $V_{212}$ and the voltage introduced by photo-diode 104 ($V_{photo}$). That is, $V_{214}=V_{off}+V_{def}+V_{photo}$. Thus, the difference between $V_{214}$ and $V_{212}$ is equal to $V_{photo}$. As a result, the effect of $V_{off}$ is canceled.

Based on FIGS. 2 and 3, the circuit in FIG. 2 is basically a dual sampling circuit that samples the output of op-amp 112 at two predetermined time intervals.

Returning now to FIG. 2, a source follower is preferably connected to lines 212 and another source follower is preferably connected to lines 214. One of the advantages of this arrangement is that voltages (instead of charges) on capacitors 208 and 210 are being measured. A second advantage is that switches do not need to be directly connected to lines 212 and 214. The problem of connecting a switch thereto is that it is generally difficult to eliminate the variation in characteristics of such a switch.

Returning now to FIG. 1, a block 140 is coupled to the output terminal of op-amp 116 (in a similar manner as block 130 is connected to the output terminal of op-amp 112). The structure of block 140 is similar to the structure of block 130. This block generates two output signals on lines 142 and 143 in response to two timing signals 165–166. In a preferred embodiment, timing signals 135 and 165 are the same and timing signals 136 and 166 are the same. The difference between the output signals on lines 142–143 cancels the effect of the offset voltage of op-amp 116.

In FIG. 1, four transistors, 145–148, are shown to be used as source follower because each bit line uses two transistors configured as source follower. The use of transistors is preferred (instead of more complex design) because of their small physical size. The transistors could be p or n channel devices.

Figure 4:
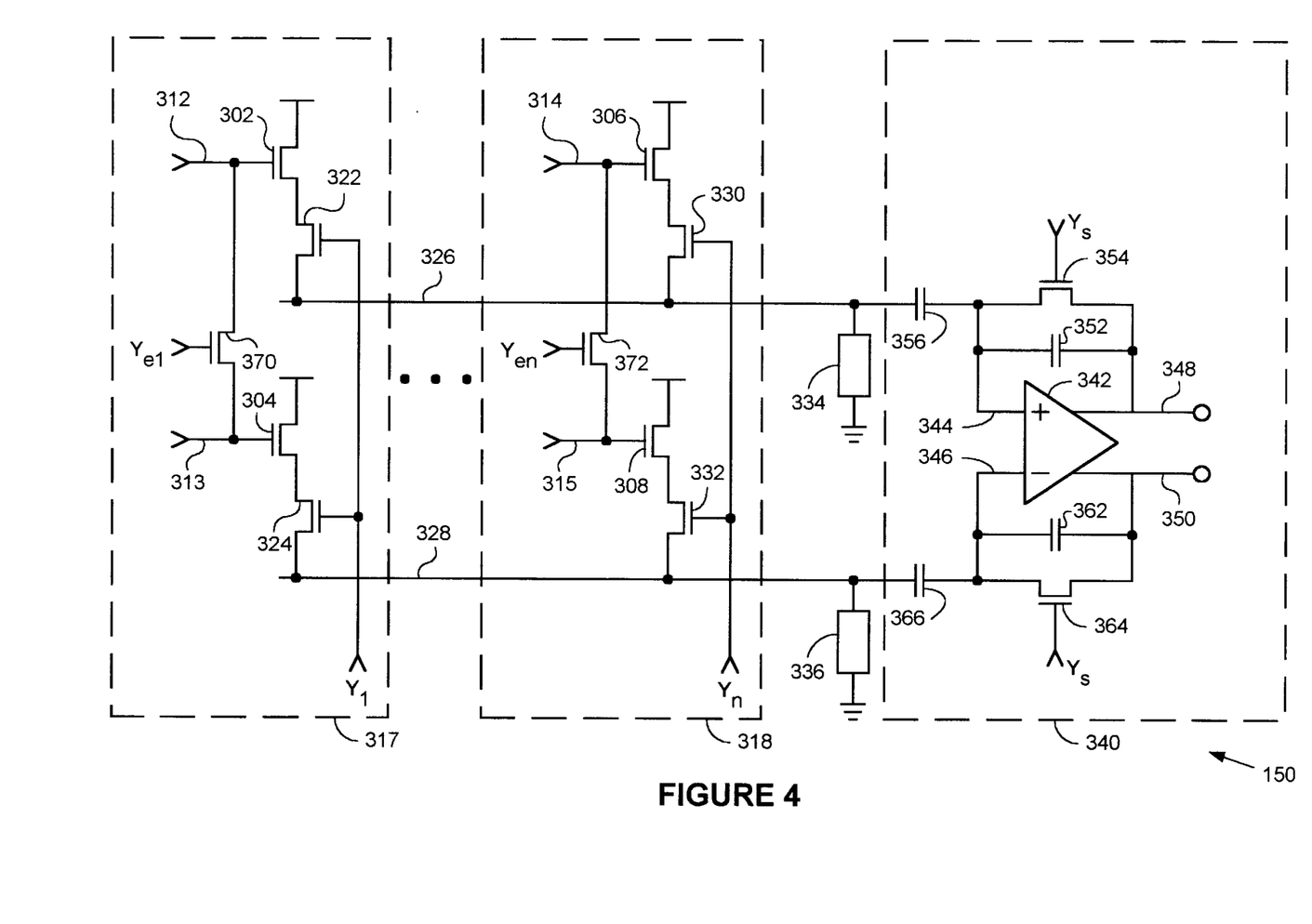
FIG. 4 is a schematic diagram of a circuit arrangement of the present invention that can eliminate the effect of the gate to source voltage drop in a transistor configured as a source follower.
Figure 6:
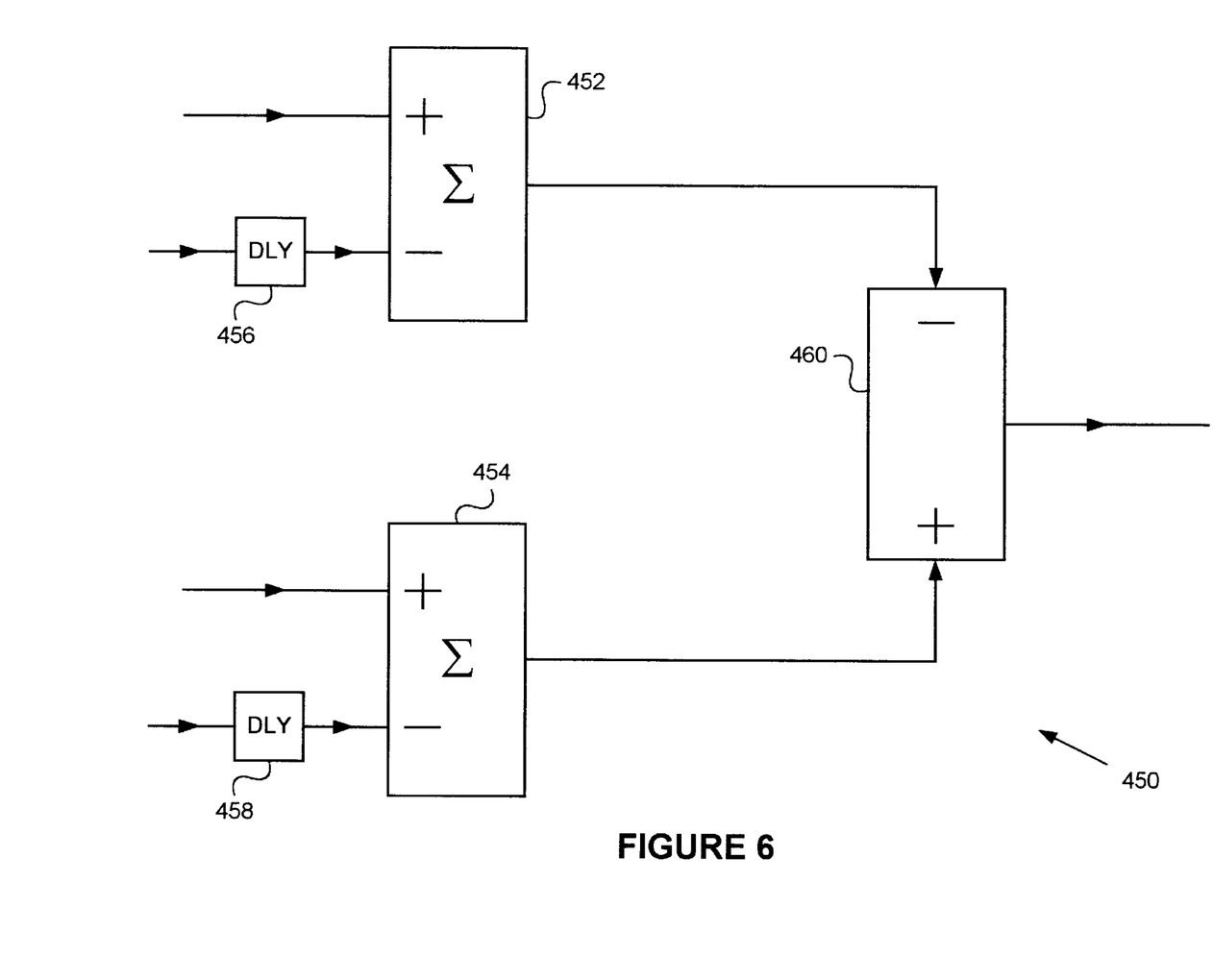
FIG. 6 is a block diagram of a generalized arrangement of the present invention that can eliminate the effect of the gate to source voltage drop in a transistor configured as a source follower.

It is known that there is a voltage drop between the gate and source terminals of a transistor. Thus, the output voltage of the source follower is lower than the input voltage by a certain threshold voltage level ($V_T$). One problem of this design is that this voltage is different for different transistors, even when the transistors are fabricated on the same chip. This is undesirable because the output voltage will have a range of uncertainty. One aspect of the present invention is a circuit for eliminating the effect of the difference in $V_T$ on the output voltage. In FIG. 1, transistors 145–148 and this novel circuit are shown as block 150. A schematic diagram showing one embodiment of block 150 is shown in FIG. 4. Additional details of block 150 is shown in FIG. 6. The output of block 150 has two signals on lines 152 and 153. As explained below, the variation in $V_T$ can be canceled by taking the difference between these two signals. Block 150 is controlled by timing signals (not shown) so that the circuit therein can be used to process all the data generated by the array of photo-diodes. The output lines are time-divided so that the output signal corresponding to a photo-diode occupies one time slot. Consequently, the signals of the whole image can be transmitted using these lines 152 and 153.

As a result of the present invention, the variation in $V_{off}$ and $V_T$ introduced by semiconductor processing variations can be either eliminated or greatly reduced.

FIG. 4 is a schematic diagram of one embodiment of block 150 which contains a plurality of source followers. Specifically, transistors 302, 304, 306 and 308 of FIG. 4 correspond to transistors 146, 145, 147 and 148, respectively, of FIG. 1. Further, lines 312–315 of FIG. 4 correspond to lines 133, 132, 143 and 142 of FIG. 1.

Block 150 contains n substantially identical circuit blocks for processing signals from the n bit lines. Only two of them are shown (blocks 317 and 318). In block 317, transistors 302 and 304 are set up as source followers. They are coupled by two pass transistors 322 and 324 to two separate lines 326 and 328 that are common to all the n blocks. Both pass transistors 322 and 324 are controlled by a timing signal $Y_1$. Thus, signals from lines 312 and 313 (which correspond to lines 212 and 214, respectively, of FIG. 2) are coupled to lines 326 and 328, respectively, only when signal $Y_1$ is positive. Similarly, transistors 306 and 308 in block 318 are set up as source followers. They are coupled by two pass transistors 330 and 332 to the common lines 326 and 328. Both pass transistors 330 and 332 are controlled by a timing signal $Y_n$. Thus, signals from lines 314 and 315 are coupled to lines 326 and 328, respectively, only when signal $Y_n$ is positive.

A load 334 is used to connect line 326 to ground. This load is needed to complete a source follower circuit. Similarly, a load 336 is used to connect line 328 to ground so as to complete a source follower circuit. Loads 334 and 336 could be implemented as resistors or current sources.

One of the problems of using a transistor is that there is a voltage drop between its gate terminal and source terminal. In the present invention, a correlated double sampling buffer 340, in combination with a novel circuit arrangement and associated method, is used to eliminate the effect of this voltage drop. Other systems for the elimination is shown in FIG. 6.

Buffer 340 comprises a differential op amp 342 that accepts two input signals (on lines 344 and 346) and generates two output signals (on lines 348 and 350). Other embodiments will be described below. A capacitor 352 is connected between lines 344 and 348. A transistor 354 is connected in parallel to capacitor 352. Line 344 is also connected to common line 326 through a capacity 356. Similarly, a capacitor 362 is connected between lines 346 and 350. A transistor 364 is connected in parallel to capacitor 362. Line 346 is also connected to line 328 through a capacity 366. In buffer 340, capacitor 356 has the same value as capacitor 352. Similarly, capacitor 366 has the same value as capacitor 362.

Another aspect of the present invention is that the gate terminals of the two source follower transistors are connected by a reset circuit. This circuit could be a transistor. Alternatively, it could be a connection to a reference voltage. In block 317, the gate terminals of source follower transistor 302 and 304 are connected by a transistor 370. The gate terminal of transistor 370 is connected to a timing signal $Y_{e1}$. Similarly, the gate terminals of transistor 302 and 304 in block 317 are connected by a transistor 372. The gate terminal of transistor 372 is connected to a timing signal $Y_{en}$. These two transistors can place the gate terminals of the corresponding source follower at the same time under the control of a timing signal. As explained below, buffer 340 can obtain information about the difference in $V_T$ as a result of this operation.

The operation of block 150 is explained with reference to the timing diagrams in FIG. 5. Time is divided into time intervals, referenced as $T_{6a}$, $T_{6b}$, $T_{7a}$, and $T_{7b}$, $T_8$, etc. At time $T_{6a}$, signal $Y_1$ becomes positive, thereby turning on transistors 322 and 324. As a result, the voltage at line 326 ($V_{326}$) differs from the voltage at line 312 ($V_{312}$, which is the same as $V_{212}$ of FIG. 3) by $V_T$. Similarly, the voltage at line 328 ($V_{328}$) differs from the voltage at line 313 ($V_{313}$, which is the same as $V_{214}$ of FIG. 3) by $V_T + \Delta$, where $\Delta$ accounts for the variation in $V_T$.

During time interval $T_{6a}$, signal $Y_s$ turns positive also. Thus, the voltage at the output line 348 ($V_{348}$) is the same as the voltage at input line 344, which is the same as the voltage $V_{326}$ at line 326. Similarly, the voltage at the output line 350 ($V_{350}$) is the same as the voltage at input line 346, which is the same as the voltage $V_{328}$ at line 328. Thus, the difference $\Delta$ is still present in $V_{350}$ and $V_{348}$.

At time $T_{6b}$, signal $Y_{e1}$ becomes positive, thereby turning on transistor 370. As a result, the voltages at lines 312 and 313 are substantially the same. The difference between the voltages at lines 326 and 328 is the difference $\Delta$ between the threshold voltage of transistors 302 and 304. At this time, the signal $Y_s$ returns to ground. This difference $\Delta$ is captured by buffer 340 and cancels the same difference $\Delta$ that is present in time interval $T_{6a}$. As a result, the difference between $V_{348}$ and $V_{350}$ is equal to $V_{photo}$, which is related to the charge on the photo-diode only.

At time $T_{7a}$, signal on the next bit line, i.e., $B_2$, is processed. Thus, signals $Y_2$ and $Y_s$ turn positive. At time $T_{7b}$, signal $Y_s$ returns to ground while signal $Y_{e2}$ turns positive. Thus, the operation described above for bit line $B_1$ repeats itself. This operation continues until the data in all the bit lines $B_1$ to $B_n$ are processed.

Figure 5:
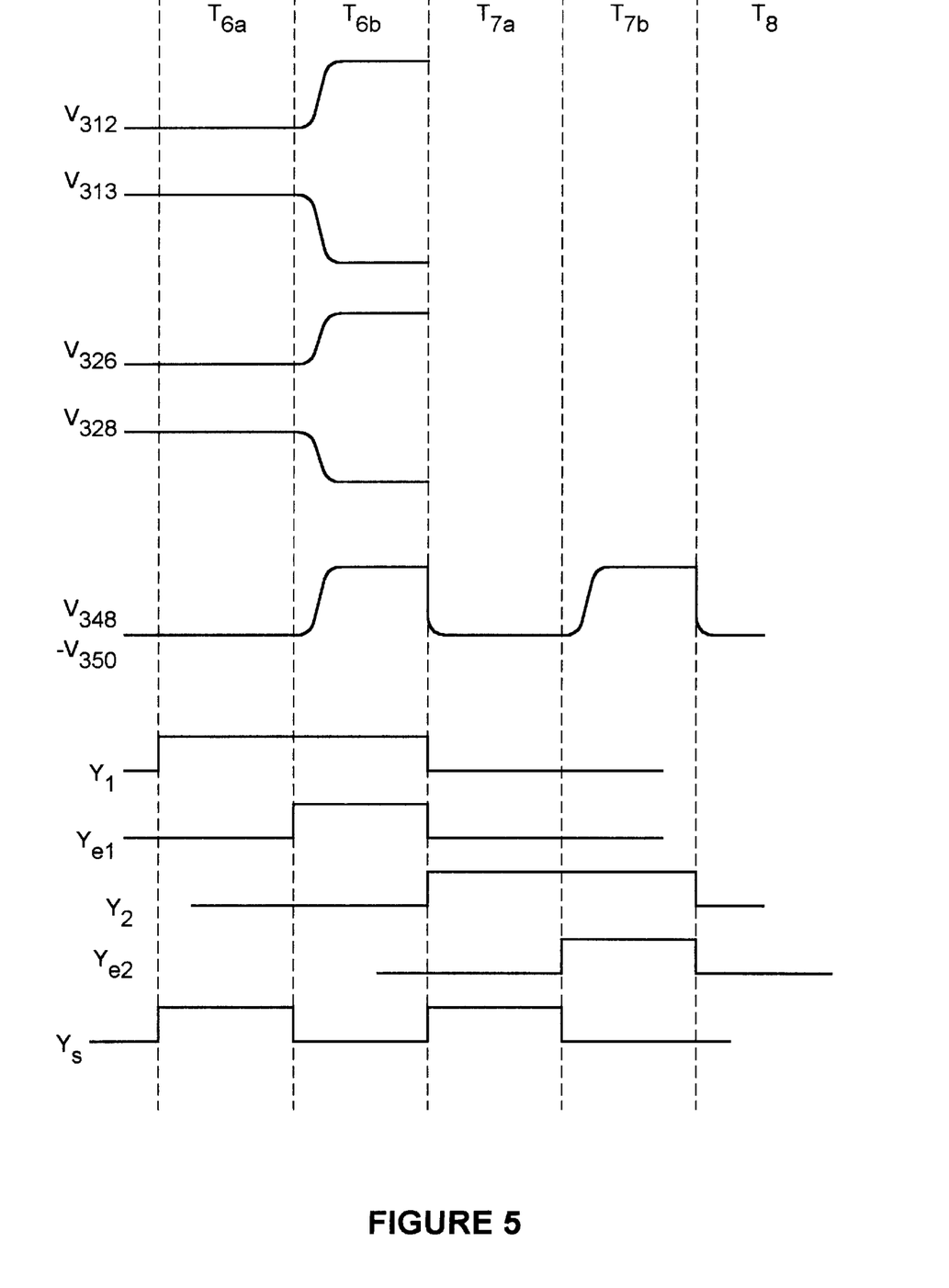
FIG. 5 shows timing diagrams related to the operation of the circuit arrangement shown in FIG. 4.

It can be seen from the above description of FIGS. 4 and 5 that buffer 340, in combination of the reset circuitry, allows the difference $\Delta$ to be canceled. The general principle of such a circuit is described in a block diagram 450 of FIG. 6. Diagram 450 contains a summation block 452 that is used to process signal on line 326 of FIG. 4 and another summation block 454 that is used to process signal on line 328 of FIG. 4. In the following description, it is assumed that the transistors in block 317 in FIG. 4 is connected to the block in diagram 450. The connection with other blocks (e.g., block 318) yields similar results. Summation block 452 contains a "plus" input for accepting a signal appearing on line 326 of FIG. 4. This signal can be written as $V_{off} + V_{def} + V_{T1}$, where $V_{off} + V_{def}$ is the voltage on line 312 of FIG. 4 (i.e., prior to applying a reference voltage) and $V_{T1}$ is the threshold voltage of transistor 302. At a different time interval (shown in FIG. 6 by a delay block 456), a reference voltage Vref is applied to line 313 of FIG. 4. The resulting signal on line 326 is applied to the "minus" input of summation block 452. The value of the signal is given by $V_{ref} + V_{T1}$. The output of summation block 452 is given by $V_{off} + V_{def} - V_{ref}$. Thus, the effect of $V_{T1}$ on the output voltage is eliminated.

Similarly, summation block 454 contains a "plus" input for accepting a signal appearing on line 328 of FIG. 4. This signal can be written as $V_{off} + V_{def} + V_{photo} + V_{T2}$, where $V_{off} + V_{def} + V_{photo}$ is the voltage on line 313 (prior to applying a reference voltage) and $V_{T2}$ is the threshold voltage of transistor 304. At a different time interval (shown in FIG. 6 by a delay block 458), a reference voltage Vref is applied to line 313 of FIG. 4. Thus, the signal at the "minus" input of summation block 452 is given by $V_{ref} + V_{T2}$. The output of summation block 452 is given by $V_{off} + V_{def} + V_{photo} - V_{ref}$. Thus, the effect of $V_{T1}$ on the output voltage is eliminated.

It should be noted that the reference voltage can be measured either before or after the $V_{off} + V_{def} + V_{photo}$ and $V_{off} + V_{def}$ signals are measured. The order of measuring is not important. The delay blocks 456 and 458 are used merely to designate a different time intervals.

The outputs of summations blocks 452 and 454 are applied to the "minus" and "plus" terminals, respectively, of another summation block 460. The output of summation block 460 is $V_{photo}$ because all common components (including $V_{ref}$) are canceled out. As a result, the voltage arising from the photo-sensor can be accurately measured.

It should be noted that the operations of the blocks in FIG. 6 can be performed by either digital or by analog means. Such variations are well known by persons skilled in the art.

Figure 7:
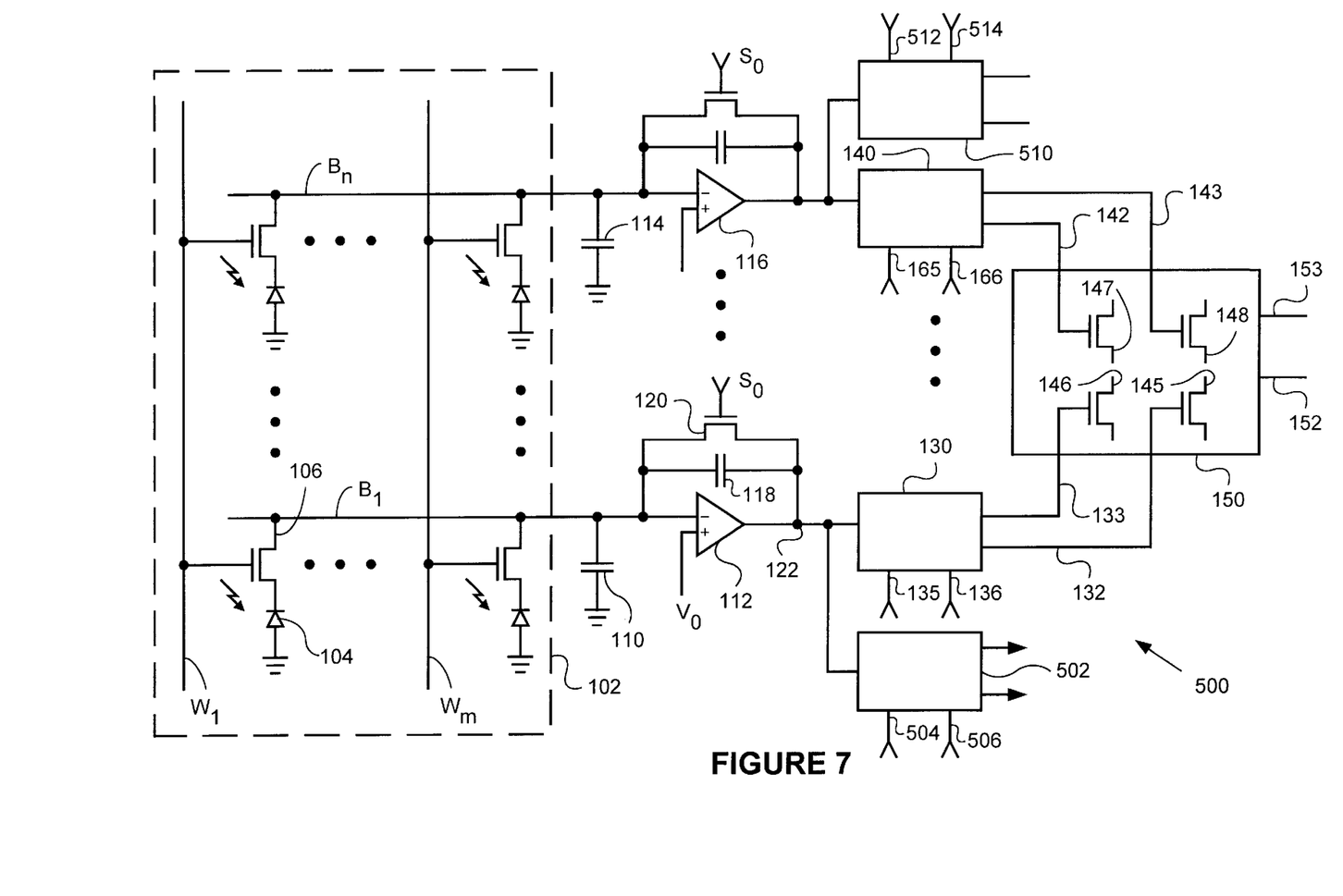
FIG. 7 is a schematic diagram of an alternative image acquisition and processing system of the present invention.

Another embodiment of the image acquisition and processing system is now described. FIG. 7 shows a schematic diagram of a system 500 that is similar to system 100 of FIG. 1. Same elements in FIGS. 1 and 7 share the same numeral references. In FIG. 7, two blocks 502 and 130 are connected to the output of op-amp 112 (while only block 130 is connected to op-amp 112 in FIG. 1). The circuit in block 502 is essentially the same as block 130 (and is shown in FIG. 2). It is controlled by two timing signals 504 and 506. Similarly, two blocks 510 and 140 are connected to the output of op-amp 116 (while only block 140 is connected to op-amp 116 in FIG. 1). It is controlled by two timing signals 512 and 514. The circuit in block 510 is essentially the same as block 130 (and is shown in FIG. 2). The timing signals 504, 512, 135 and 165 are preferably the same; and the timing signals 506, 514, 136 and 166 are preferably the same. In short, the output terminal of each op-amp in FIG. 7 is connected to two blocks.

In this embodiment, blocks 130 and 140 are used to process signals generated by word line $W_1$ and blocks 504 and 510 are used to process signals generated by word lines $W_2$. Thus, the first few steps in the sequence of operation for this embodiment is (i) read word line $W_1$ and store in blocks 130, ..., 140, (ii) read word line $W_2$ and store in blocks 502, ..., 510, (iii) process all the bit lines in a way similar to that shown in FIG. 5, (iv) read word line $W_3$ and store in blocks 130, .... 140, (v) read word line $W_4$ and store in blocks 502, ..., 510, (vi) process all the bit lines in a way similar to that shown in FIG. 5. These steps are repeated such that all word lines are processed.

Note that FIG. 7 can be modified so that more than two blocks (e.g., p blocks) can be connected to the output terminal of an op-amp. In this case, p word lines are read first before the bit lines are processed.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. An image acquisition and processing system comprising:

a plurality of photo-sensors arranged in an array;

a plurality of signal processing devices each periodically coupled to at least one of said photo-sensors, each of said signal processing devices comprising:

an integrator containing an operational amplifier, said integrator generating a voltage related to charges applied thereto, said voltage further containing a component related to an offset voltage of said operational amplifier;

a dual sampling circuit connected to said integrator and having a first and a second output terminals, said dual sampling circuit sampling voltage generated by said integrator at a first predetermined time interval and generating a first voltage at said first output terminal, said dual sampling circuit sampling voltage generated by said integrator at a second predetermined time interval and generating a second voltage at said second output terminal;

a first transistor coupled to said first output terminal of said dual sampling circuit, said first transistor being configured as a source follower, said source follower having a first threshold voltage between its input and output terminals;

a second transistor coupled to said second output terminal of said dual sampling circuit, said second transistor being configured as a source follower, said source follower having a second threshold voltage between its input and output terminals, said first and said second threshold voltages having a differential value; and means for applying a common voltage to said first and said second transistors for a third predetermined time period; and means for coupling one of said photo-sensors to one of said integrators during said second predetermined time period, resulting in said second voltage being related to intensity of radiation received by said one photo-sensor;

a first summation device periodically coupled to said first transistor of at least one of said signal processing devices for determining a difference between outputs of said first transistor when said first voltage is applied thereto and when said common voltage is applied thereto;

a second summation device periodically coupled to said second transistor of at least one of said signal processing devices for determining a difference between outputs of said second transistor when said second voltage is applied thereto and when said common voltage is applied thereto; and a third summation device for forming a difference between outputs of said first an d said second summation devices, thereby substantially eliminating said differential value.

2. An image acquisition and processing system comprising:

a plurality of photo-sensors arranged in an array;

a plurality of signal processing device s each periodically coupled to at least one of said photo-sensors, each of said signal processing devices comprising:

an integrator containing an operational amplifier, said integrator generating a voltage related to charges applied thereto, said voltage further containing a component related to an offset voltage of said operational amplifier;

a first circuit having a storage device for storing said voltage generated by said integrator, said first circuit containing a switch for connecting said storage device to said integrator for a first predetermined time period, thereby storing a first voltage in said storage device, said first volt age having a predetermined relationship with said offset voltage;

a second circuit having a storage device for storing said voltage generated by said integrator, said second circuit containing a switch for connecting said storage device to said integrator for a second predetermined time period, thereby storing a second voltage in said storage device, said second voltage having substantial the same predetermined relationship with said offset voltage such that said offset voltage can be substantially canceled out by taking a difference between said first and said second voltages;

a first transistor coupled to said storage device of said first circuit, said first transistor being configured as a source follower, said source follower having a first threshold voltage between its input and output terminals;

a second transistor coupled to said storage device of said second circuit, said second transistor being configured as a source follower, said source follower having a second threshold voltage between its input and output terminals, said first and said second threshold voltages having a differential value; and means for equalizing input voltages to said first and said second transistors for a third predetermined time period;

means for coupling one of said photo-sensors to one of said integrators during said second predetermined time period, resulting in said second voltage being related to intensity of radiation received by said one photo-sensor; and a correlated double sampling device periodically coupled to at least one of said signal processing devices for generating a third voltage related to said first voltage and a fourth voltage related to said second voltage, said correlated double sampling operating cooperatively with said means for equalizing to substantially cancel said differential value.

3. An image acquisition and processing system, comprising:

a plurality of signal processing devices, each being arranged to be periodically coupled to at least one of a plurality of photo-sensors arranged in an array, each of said signal processing devices comprising:

an operational amplifier configured as an intmrator for generating an output signal related to charges applied thereto, the output signal being affected by an offset voltage of the operational amplifier; and, a dual sampling circuit for sampling the output signal of the operational amplifier at two predetermined time intervals and outputting those sampled output signals at first and second output terminals, the operational amplifier being coupled to a photo sensor during one of said predetermined time intervals, and the difference between the two sampled output signals reducing or canceling the effect of the offset voltage;

wherein each signal processing device further comprises:

first and second source followers connected to said first and second output terminals respectively, each source follower having a threshold voltage between its input and output terminals, and a differential value existing between the threshold voltages of the first and second source followers;

means for applying a common voltage to said first and second source followers for a predetermined time period;

and the image acquisition and processing system further comprises:

a double sampling device periodically coupled to one of said signal processing devices for generating two signals related to the two output signals sampled by the dual sampling circuit, and for operating cooperatively with said means for applying to reduce or eliminate said differential value.

* * * * *